United States Patent Office 3,739,006
Patented June 12, 1973

3,739,006
BIS DITHIOCARBANILATES
John Joseph D'Amico, Akron, Ohio, assignor to Monsanto Company, St. Louis, Mo.
No Drawing. Filed Feb. 2, 1970, Ser. No. 8,023
Int. Cl. C07c 155/08
U.S. Cl. 260—455 A       3 Claims

ABSTRACT OF THE DISCLOSURE

Bis dithiocarbanilates of the formula

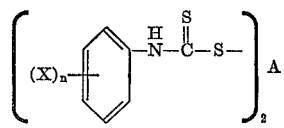

wherein A is thioalkylene, oxyalkylene, or xylylene, X is lower alkyl, chloro, bromo, fluoro, iodo, nitro or hydrogen and $n$ is one or two are disclosed. The new compounds are useful as nematocides, bacteriocides, fungicides and insecticides.

---

The present invention relates to bis dithiocarbanilates. More particularly it relates to bis dithiocarbanilates containing an aromatic nucleus or a chalcogen atom within the bridging chain.

SUMMARY OF THE INVENTION

Bis dithiocarbanilates of the formula

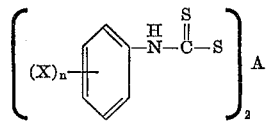

where A is thioalkylene, oxyalkylene, or xylylene, X is lower alkyl, chloro, bromo, fluoro, iodo, nitro or hydrogen and $n$ is one or two are prepared. The new compounds possess biological properties which make them useful as pesticides for control of undesirable organisms.

The compounds of this invention are toxic toward nematodes, small worm-like parasitic animals present in the soil, which are destructive to plant life. Since the compounds are not phytotoxic, soil may be treated to control the parasites without harm to the plants growing within the area to be protected.

The bacteriostatic and fungistatic activity of the compounds makes them useful for antiseptic purposes. All of the compounds have microbiological properties but the dihalo derivatives have enhanced activity. For example, the 3,4-dichloro derivatives are as much as one hundred times more toxic toward certain micro-organisms. The new compounds also have insecticidal activity. These and other advantages of the compounds will become apparent as the description of the invention proceeds.

DESCRIPTION OF THE PREFERRED EMBODIMENTS

The bis dithiocarbanilates of this invention are prepared by reaction of a dithiol with a phenyl isothiocyanate, or by the reaction of a dihalo-hydrocarbon with a salt of a dithiocarbanilate. Examples of suitable dithiols are 2-mercaptoethyl sulfide, 3-mercaptopropyl sulfide, para-xylene-α,α'-dithiol. Examples of suitable dihalo reactants are bis-2 - chloromethylsulfide, bis-2-bromomethylsulfide, bis-2-chloromethyl ether, bis-2-chloropropylsulfide, bis-2-bromopropylsulfide, bis-2-bromoethyl ether, bis-2-chloroethyl ether, bis-2-bromoethyl ether, bis-2-chloropropyl ether, bis-2-bromopropyl ether, bis-2-chlorobutyl ether and bis-2-bromobutyl ether.

The preferred method for preparation of the bis carbanilates is the reaction of a dithiol with a phenyl isocyanate. In the alternate method for their preparation, the use of the triethylamine salt of a dithiocarbanilate is preferred.

Examples of compounds of this invention are α,α'-thiomethylene bis dithiocarbanilate, 2,2'-thioethylene bis dithiocarbanilate, 3,3'-thiopropylene bis dithiocarbanilate, α,α'-oxymethylene bis dithiocarbanilate, 2,2'-oxyethylene bis dithiocarbanilate, 3,3'-oxypropylene bis dithiocarbanilate, para-xylylene bis dithiocarbanilate, meta-xylylene bis dithiocarbanilate, and derivatives of these compounds having the before-mentioned substituents in the benzene ring.

EXAMPLE 1

2,2'-thioethylene bis(dithiocarbanilate)

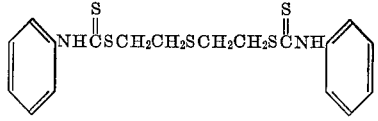

15.5 grams (0.1 mole) of (2-mercaptoethyl)sulfide, (2,2'-thiodiethanethiol), are added in one portion to a stirred solution of 27.1 grams (0.2 mole) of phenyl isothiocyanate and 2 ml. of triethylamine in 200 ml. of heptane. The temperature of the mixture rises from 20 to 33° C. After refluxing for seven hours, the mixture is stirred at room temperature for 18 hours. The slurry is cooled to 0° C. and filtered to recover the product which is air dried at 25–30° C. 38 grams (89.5% yield) of product are obtained. Recrystallized from chloroform, the 2,2'-thioethylene bis(dithiocarbanilate) melts at 101–102° C. Analysis gives 6.20% N and 37.95% S compared to 6.60% N and 37.75% S calculated for $C_{18}H_{20}N_2S_5$.

The procedure of Example 1 is followed to give substituted dithiocarbanilates by selection of the appropriate substituted phenyl isothiocyanate.

TABLE I

| Compound | Me.ting point, °C. | Analysis N Found | N Calc. | S Found | S Calc. | Yield, percent |
|---|---|---|---|---|---|---|
| 2,2'-thioethylene bis(4-chlorodithiocarbanilate) | 105–108 | 5.44 | 5.68 | 32.14 | 32.48 | 61 |
| 2,2'-thioethylene bis(4-nitrodithiocarbanilate) | ᵃ148–149 | | | 91.28 | 31.15 | 97 |
| 2,2'-thioethylene bis(4-methyldithiocarbanilate) | 81–83 | 5.66 | 6.19 | 36.16 | 35.41 | 97.5 |
| 2,2'-thioethylene bis(3,4-dichlorodithiocarbanilate) | ᵇ116–117 | 4.81 | 4.98 | 28.42 | 28.54 | 99 |
| 2,2'-thioethylene bis(3,4-dimethyldithiocarbanilate) | 79–82 | 4.99 | 5.83 | 33.95 | 33.35 | 67 |

ᵃ Recrystallized from ethyl acetate.
ᵇ Recrystallized from ethyl alcohol.

EXAMPLE 2

Para-xylylene bis(dithiocarbanilate)

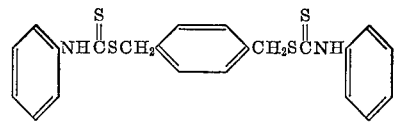

The general procedure of Example 1 is followed except the dithiol used is para-xylene α,α'-dithiol (0.1 mole) to give 44 grams (99% yield) of the desired product. Recrystallized from ethyl acetate, the para xylylene bis(dithiocarbanilate) melts at 147–148° C. Analysis gives 6.16% N compared to 6.36% N calculated for $$C_{22}H_{20}N_2S_4.$$

Other xylylene bis dithiocarbanilates are prepared by using the procedure of Example 2 and selecting the appropriate substituted phenyl isothiocyanate.

TABLE II

| Compound | Melting point, °C. | Analysis | | | | Yield, percent |
|---|---|---|---|---|---|---|
| | | N | | S | | |
| | | Found | Calc. | Found | Calc. | |
| para-Xylylene bis(4-chlorodithiocarbanilate) | a168–170 | 5.62 | 5.50 | 24.81 | 25.17 | 98 |
| para-Xylylene bis(4-nitrodithiocarbanilate) | 174–175 | | | 23.10 | 24.17 | 98 |
| para-Xylylene bis(4-methyldithiocarbanilate) | a158–159 | 5.59 | 5.98 | 27.30 | 27.37 | 98 |
| para-Xylylene bis(3,4-dichlorodithiocarbanilate) | b130–132 | 4.69 | 4.84 | 22.08 | 22.17 | 97 |
| para-Xylylene bis(3,4-dimethyldithiocarbanilate) | c158–160 | 5.58 | 5.64 | 25.17 | 25.82 | 97 |

See footnotes a and b at end of Table I.
c Recrystallized from acetone.

The new toxicants may be applied undiluted, in the form of a powder carried out on an inert carrier, or in the form of a spray containing the active ingredient in a concentration within the range of 0.01–95.0% by weight.

Although the compounds of this invention are insoluble in water, all are soluble in common organic solvents and most in acetone, chloroform, ethyl alcohol, ethyl acetate, benzene, ether and heptane. The compounds may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecylbenzenesulfonate, an amine salt as for example dibutylammonium dodecylbenzenesulfonate, alkali metal salts of sulfated fatty alcohols, ethylene oxide condensation products of alkyl phenols, or other dispersing and wetting agents. Formulation of dry compositions is accomplished by mixing with finely divided solid carriers such as talc, clay, pyrophyllite, silica and fuller's earth. The dry formulation may be used as a dust or dispersed in aqueous medium before application. If the latter, it is convenient to incorporate a wetting or dispersing aid into the formulation.

The toxicant may be formulated in minor or major proportions in accordance with the table below.

| Type of formulation | Concentration of active ingredient |
|---|---|
| 1. Granules of relatively large particle size | 5 to 50%. |
| 2. Powdery dusts | 2 to 90%. |
| 3. Wettable powders | 2 to 90%. |
| 4. Emulsifiable cencentrates | 5 to 95%. |
| 5. Solutions | .01 to 95%. |
| 6. One of the less common types of formulations depending on the desired mode of application. | .05 to 95%. |

The compounds of this invention may be used alone or in combination with other agricultural chemicals. The new compounds can be applied in compositions comprising fertilizers, insecticides, fungicides, nematocides and herbicides. Suitable formulations may include as other active ingredients ureas, carbamates, thiolcarbamates, dithiocarbamates, thionocarbamates, phenoxyacetic acid derivatives, benzoic acid derivatives, phenol derivatives and triazines. Compositions comprising one or more compounds of this invention with other biologically active ingredients are extremely useful. One obvious advantage of using such combinations is the accomplishment of combined objectives with a single application, thereby eliminating the need for separate applications.

Certain compounds of this invention are nematocides. Nematodes, a class of elongated cylindrical worms found living in the soil, include harmful and unwanted parasites which damage crops. Vegetables which grow within the soil such as potatoes, radishes, onions, sugar beets and carrots are attacked directly which result in scarred and deformed vegetables of diminished value. Where severe infestations occur, the crop may be totally destroyed. Nematodes also damage other crops by feeding upon their roots which results in plants having decreased vigor which adversely affects the yield. One advantage of the present nematocides is they are free of herbicidal properties (non-phytotoxic) which enables their use directly in the area to be protected without harming the crop.

As illustrative of the toxicity to nematodes, experiments are conducted by preparing a suspension of the nematode *Turbatrix aceti* in water and observing the motility of the organism in the presence of the toxicant. A control experiment is run at the same time in which no toxicant is employed. The nematode will flex its body at a regular rate, and as the nematocide takes effect, the rate of flexing decreases until death occurs. The control experiment shows undiminished activity after 7 days whereas in the presence of various concentrations of the toxicants, the nematodes are completely killed. The toxicants and the concentration at which the nematodes are killed are shown in Table III. Parts per million are designated as "p.p.m.."

TABLE III

Nematocidal activity

| | Concentration in p.p.m. where 100% kill |
|---|---|
| 2,2'-thioethylene bis(dithiocarbanilate) | 30 |
| 2,2'-thioethylene bis(4-chlorodithiocarbanilate) | 10 |
| 2,2'-thioethylene bis(4-nitrodithiocarbanilate) | 10 |
| 2,2'-thioethylene bis(4-methyldithiocarbanilate) | 10 |
| 2,2'-thioethylene bis(3,4-dichlorodithiocarbanilate) | 3 |
| 2,2'-thioethylene bis(3,4-dimethyldithiocarbanilate) | 10 |
| Para-xylylene bis(dithiocarbanilate) | 30 |
| Para-xylylene bis(4-nitrodithiocarbanilate) | 10 |
| Para-xylylene bis(4-methyldithiocarbanilate) | 10 |
| Para-xylylene bis(3,4-dichlorodithiocarbanilate) | 3 |

In a similar experiment, 2,2'-thioethylene bis(4-chlorodithiocarbanilate) at a concentration of 100 p.p.m. gives 100% kill of the nematode of the DD–136 strain of *Neoplectora carpocapsae* Weiser.

The nematocidal activity is shown also by observation of the amount of root knot formation caused by the nematode *Meloidogye incognita acrita*. A comparison is made between plants raised in untreated soil versus soil which has been treated with a toxicant. In each test, the soil is inoculated with the above nematode before addition of the toxicant and before setting of the test plants. The toxicants are introduced to the soil by mixing the soil with an acetone solution of the toxicant. Eight-day-old yellow straight-necked squash plants are placed in pots containing the soil and are allowed to grow for four weeks at 85° F. The pots are top watered twice a day and the plants provided with 16 hours of light.

After four weeks the plants are freed from the soil and the knots counted on the root system using a stereoscopic microscope. From these counts a mean root knot count is determined which is used to determine percent root knot control by the formula $$\text{Percent control} = 100 - \frac{\text{Treatment mean} \times 100}{\text{Control mean}}$$

The rate of application and the percent control of the Root Knot Nematode are given in Table IV.

TABLE IV

Nematocidal Activity of Compounds in Soil Containing *Meloidogye incognita acrita*

| Compound | Application, lbs./acre | Rate, kg.1ha. | Percent root knot reduction |
|---|---|---|---|
| 2,2'-thioethylene bis(4-chlorodithio-carbanilate) | 20 | 17.8 | 100 |
|  | 10 | 8.9 | 98 |
| 2,2'-thioethylene bis(4-nitrodithio-carbanilate) | 20 | 17.8 | 99 |
|  | 10 | 8.9 | 95 |
| 2,2'-thioethylene bis(4-methyldi-thiocarbanilate) | 20 | 17.8 | 52 |

Another advantage of the new toxicants is their relatively low toxicity toward mammals. A commercial nematocide, o-ethyl-S,S-dipropyl phosphorodithioate has an oral toxicity LD50 of 61.5 mg./kg. for male rats and an acute dermal toxicity MLD of 25.9 mg./kg. for rabbits. The non-toxicity of the new toxicants is shown, for example, by 2,2'-thioethylenebis(4-chlorodithiocarbanilate) which has a rat oral LD50 of 450 mg./kg. and a rabbit dermal MLD between 500 and 1000 mg./kg.

As illustrative of biological activity of the compounds of this invention, the following experiments demonstrate control of fungi and of bacteria. One percent stock solutions of the compounds are prepared in a non-toxic solvent and diluted in agar to provide samples containing the test materials at various concentrations. Petri dishes are filled with the test mixtures and the plates thus prepared inoculated with the test organisms and incubated for 48 hours at 37° C. At the end of the incubation period inspection of the plates inoculated with the test materials show complete inhibition of growth of the organisms at the concentrations shown in Table V; identical agar test plates with no test material present show normal uninhibited growth of the organisms.

TABLE V.—MICROBIOLOGICAL ACTIVITY

| | Complete inhibition of— | |
|---|---|---|
| | *Staphylococcus aureus*, p.p.m. | *Aspergillus niger*, p.p.m. |
| 2,2'-thioethylene bis(4-chlorodithiocarbanilate) | 100 | 100 |
| 2,2'-thioethylene bis(4-nitrodithiocarbanilate) | 100 | |
| 2,2'-thioethylene bis(3,4-dichlorodithio-carbanilate) | 1 | 10 |
| Para-xylylene bis(3,4-dichlorodithio-carbanilate) | 1 | 100 |

The foregoing experiments demonstrate that the compounds protect against the destructive effect of microorganisms including fungi and bacteria. Application of the test chemical to the area to be protected, in which the organism may or may not already be present, in a concentration toxic to such microorganisms affords a high degree of protection. For achieving these various objects, it is often advantageous, where the compounds are applied in an aqueous medium, to incorporate into the aqueous medium a surface-active agent in small amounts sufficient to lower the surface tension of water. The amount will usually be within the range of 0.001–1.0%. Besides water, organic solvents, and admixtures thereof, suitable inert carriers which include finely divided solids, as for example clay and silica, may be added.

Still further biological activity is demonstrated in tests against insect pests. 100% kill of yellow fever mosquito larvae (*Aedes aegypti*) is achieved with concentrations of 2 p.p.m. of 2,2'-thioethylene bis(4-chlorodithiocarbanilate).

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A compound of the formula

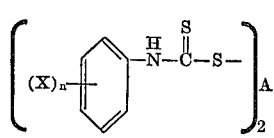

wherein A is thioalkylene of 2–6 carbon atoms or para-xylylene, X is chloro and *n* is two, X being in the 3 and 4 positions.

2. A compound according to claim 1 wherein A is 2,2'-thioethylene.

3. A compound according to claim 1 wherein A is p-xylylene.

References Cited

UNITED STATES PATENTS

| 3,579,516 | 5/1971 | Albert | 260—455 A |
| 1,835,050 | 12/1931 | Howland | 260—455 A |
| 3,051,625 | 8/1962 | Rao | 260—455 A |
| 3,202,572 | 8/1965 | Werres et al. | 260—455 A |
| 3,061,624 | 10/1962 | Ludvik et al. | 260—455 A |
| 2,621,143 | 12/1952 | Goodhue et al. | 260—455 A |
| 2,941,879 | 6/1960 | Goodhue et al. | 260—455 A |
| 3,211,770 | 10/1965 | Pyne | 260—455 A |
| 3,686,413 | 8/1972 | Hollrah | 424—300 |

FOREIGN PATENTS

| 748,413 | 4/1944 | Germany | 260—455 A |

OTHER REFERENCES

Kulka: "Hydrolysis and Hydrazinolysis of Esters of N,N-dimethyldithiocarbamic Acid," (1956), CA 51, pp. 3481–82 (1957).

LEWIS GOTTS, Primary Examiner

G. HOLLRAH, Assistant Examiner

U.S. Cl. X.R.

424—300